(12) United States Patent
Hui et al.

(10) Patent No.: US 8,897,640 B2
(45) Date of Patent: *Nov. 25, 2014

(54) DIGITAL SUBCARRIER OPTICAL NETWORK UTILIZING DIGITAL SUBCARRIER CROSS-CONNECTS WITH INCREASED ENERGY EFFICIENCY

(75) Inventors: Ron Hui, Lenexa, KS (US); Andrea Fumagalli, Dallas, TX (US)

(73) Assignees: University of Kansas, Lawrence, KS (US); Board of Regents, The University of Texas System, Austin, TX (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/565,648

(22) Filed: Aug. 2, 2012

(65) Prior Publication Data

US 2013/0209101 A1   Aug. 15, 2013

Related U.S. Application Data

(63) Continuation of application No. 13/330,647, filed on Dec. 19, 2011, now Pat. No. 8,639,116.

(60) Provisional application No. 61/424,581, filed on Dec. 17, 2010.

(51) Int. Cl.
*H04J 14/00* (2006.01)
*H04Q 11/00* (2006.01)
*H04L 27/26* (2006.01)
*H04J 14/02* (2006.01)

(52) U.S. Cl.
CPC ......... *H04J 14/0221* (2013.01); *H04J 14/0268* (2013.01); *H04Q 11/0005* (2013.01); *H04J 14/0257* (2013.01); *Y02B 60/50* (2013.01); *H04J 14/0212* (2013.01); *H04L 27/2697* (2013.01); *H04J 14/0298* (2013.01)
USPC ................................. 398/56; 398/51; 398/54

(58) Field of Classification Search
CPC .. H04B 10/61; H04B 10/611; H04B 10/2575; H04B 10/25759; H04Q 2011/0058; H04J 14/0298; H04J 2203/0016; H04J 2203/0021; H04J 2203/0003; H04J 2203/0005; H04J 2203/0012; H04J 2203/0023
USPC ................................... 398/45–51, 54, 57, 76
See application file for complete search history.

(56) References Cited

U.S. PATENT DOCUMENTS

| | | | |
|---|---|---|---|
| 5,663,820 A | 9/1997 | Shiragaki | |
| 5,956,165 A | 9/1999 | Fee | |
| 5,995,256 A * | 11/1999 | Fee | 398/34 |
| 6,559,984 B1 | 5/2003 | Lee | |
| 6,925,257 B2 * | 8/2005 | Yoo | 398/47 |
| 7,796,898 B2 | 9/2010 | Armstrong | |
| 2003/0030866 A1 | 2/2003 | Yoo | |
| 2006/0008273 A1 * | 1/2006 | Xue et al. | 398/51 |
| 2010/0008242 A1 | 1/2010 | Schein | |
| 2010/0080571 A1 | 4/2010 | Akiyama | |

* cited by examiner

*Primary Examiner* — Dalzid Singh

(74) *Attorney, Agent, or Firm* — Spencer Fane; Britt Browne LLP

(57) ABSTRACT

The present invention provides reduced power dissipation and other benefits at the optical transport network layer by utilizing a digital subcarrier optical network comprising multiple digital subcarrier cross-connect switches. This offers several advantages for optical networks, including spectral efficiency and robustness against signal corruption and consumption of less energy than traditional TDM-based electric switches (OTN/SONET/SDH).

20 Claims, 10 Drawing Sheets

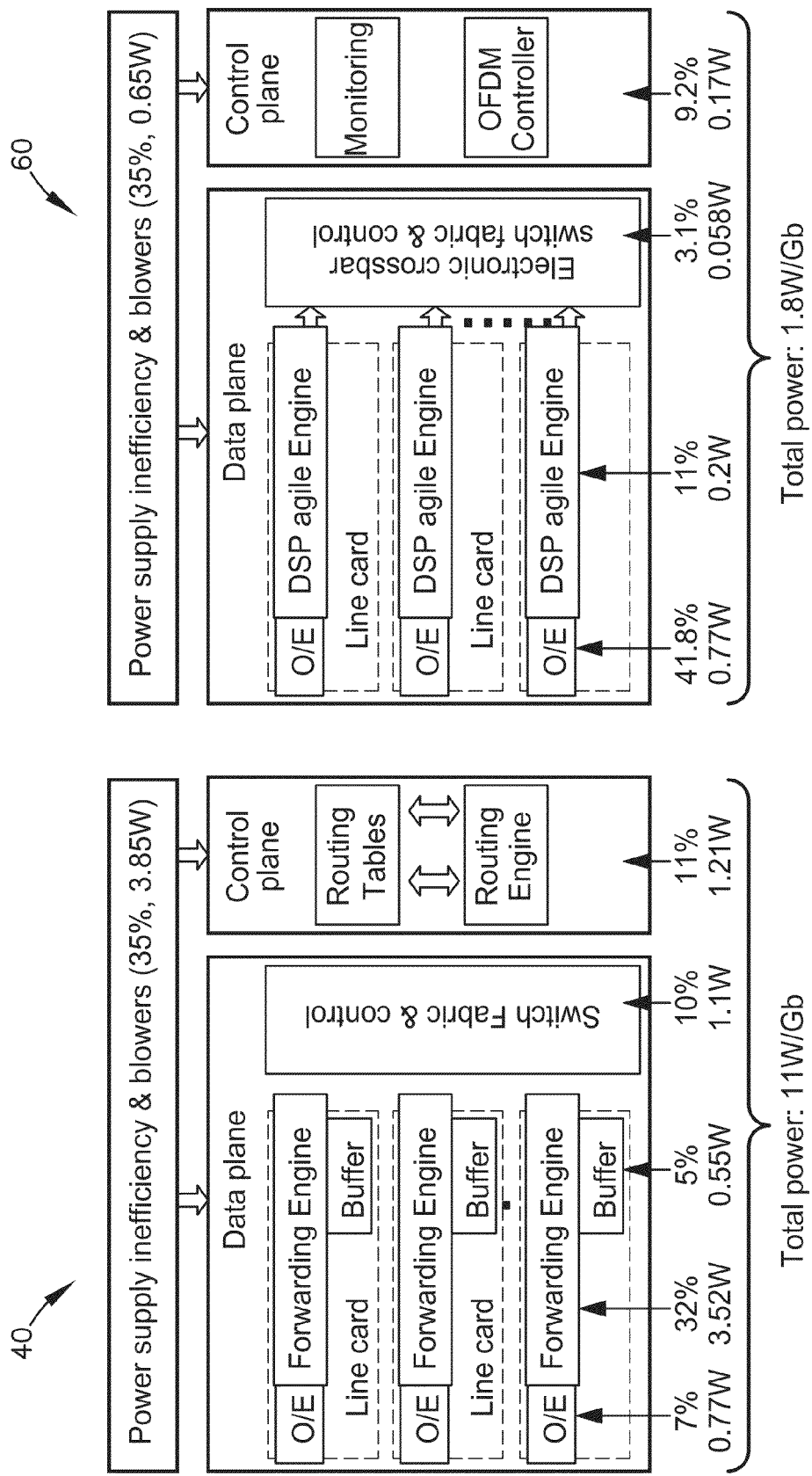

US 8,897,640 B2

DIGITAL SUBCARRIER OPTICAL NETWORK UTILIZING DIGITAL SUBCARRIER CROSS-CONNECTS WITH INCREASED ENERGY EFFICIENCY

RELATED APPLICATIONS

The present U.S. non-provisional patent application is a continuation and claims priority benefit of an earlier-filed non-provisional patent application titled DIGITAL SUBCARRIER OPTICAL NETWORK UTILIZING DIGITAL SUBCARRIER CROSS-CONNECTS WITH INCREASED ENERGY EFFICIENCY, Ser. No. 13/330,647, filed Dec. 19, 2011, which, in turn, is related to and claims priority of an even earlier-filed provisional patent application titled POWER EFFICIENT OPTICAL NETWORK CROSS-CONNECT BASED ON FREQUENCY-DIVISION MULTIPLEXING AND RF SWITCHING, Ser. No. 61/424,581, filed Dec. 17, 2010. The identified earlier-filed applications are hereby incorporated by reference into the present application as though fully set forth herein.

BACKGROUND OF THE INVENTION

1. Technical Field

The present invention relates generally to optical communication networks, and, more specifically, to optical transport networks as designated by the International Telecommunication Union.

2. Background

Optical networks are connected through optical fibers with elements capable of providing optical channel transport, multiplexing, routing, management of the network, supervision, and redundancy for survivability. Many telecommunications and data carriers around the world are increasingly using Optical Transport Networks (OTN) for their long-haul and metro-area networks. OTN is growing faster than Synchronous Optical Networking and Synchronous Digital Hierarchy (SONET/SDH) and has the potential of boosting bandwidth and increasing networking functionality.

Optical networks utilize optical fibers and lasers or highly coherent light from light-emitting diodes to transfer multiple digital bit streams of data over the network. SONET/SDH was originally designed to replace Plesiochronous Digital Hierarchy (PDH) which was used to transport large amounts of telephone calls and data traffic over the same fiber without requiring synchronization across the multiplexed tributary channels. PDH used circuit-switching and was spectrally efficient only if the sources of the tributary channels were synchronized. However, as these optical networks continued to grow, so did the traffic on them. SONET and SDH, a superset of SONET, were developed to support real-time, uncompressed, circuit-switched, digitally encoded voice and data. SONET/SDH allows for simultaneously transporting many different circuits (tributaries) of differing origin using a single framing protocol, and is ideal for transporting Asynchronous Transfer Mode (ATM) frames, Internet protocol (IP) packets, or Ethernet frames. Generally, a frame is a group of data bits in a specific format (ATM, Ethernet, IP and others) with a flag at the beginning and the end of the data bits to define the individual frame.

The message protocols transported by SONET and SDH are similar with a few exceptions. SONET is typically used in North America whereas SDH is widely used throughout the world. The protocol of SONET/SDH is a time (byte) division multiplexed structure wherein a header is interleaved between the data to permit the encapsulated data to have its own unique frame rate and be present within the SONET/SDH frame structure and rate. The protocols buffer data during transit for at least one frame before sending. This buffering allows for multiplexed data to move within the overall framing (transmission) to compensate for different frame rates. The protocol becomes more complex based on when and where in the data stream padding is needed and at what level of the multiplexing structure.

In optical networks, SONET/SDH add/drop multiplexers and cross-connectors have relatively high power consumption, and with increased demand for these networks for industry, public works, school, and residential use, energy usage increases. The networking community's energy saving object is becoming more important now that Internet traffic is expected to continue steep growth driven by video applications and cloud computing advances.

Energy consumption is a consideration in designing communication networks and subsystems including hardware, add/drop multiplexers, and cross-connectors. For example, Internet Protocol (IP) routers can lower their packet processing rate when traffic volume is low to reduce energy consumption in both optical and electrical networks. All-optical Wavelength Division Multiplexing (WDM) networks can be made more energy efficient by bypassing the optical-electrical-optical conversion at the intermediate optical cross-connection nodes. One layer of the communication networks where increased energy efficiency is desirable in current and future networks is in the third network layer, the OTN. The OTN layer is often used between the IP and the WDM layer to provide sub-wavelength capacity to the links of routers. Present day OTN solutions perform similar to SONET/SDH and perform digital time division multiplexing of multiple sub-wavelength channels to fill out the entire wavelength of a channel. Each sub-wavelength channel is individually routed using Digital Cross-Connects (DXC), and each DXC requires approximately 10 Watts per 10 Gigabits of carried data to perform transport functionalities using current technology. Similar levels of energy consumption take place in the OTN add/drop multiplexers, where tributary signals from the end-user are injected into or extracted from the OTN network. As the energy consumption of telecommunications networks is forecast to grow manifold due to the rapid increase of traffic volume in broadband networks, combined with the expectation of higher energy prices and increasing concerns about global warming, finding energy-efficient solutions becomes an important issue for telecommunications networks.

At the IP layer, energy-aware packet forwarding techniques suggest that smaller IP packets increase the energy consumption of routers, so optimizing the size of IP packets can make routers more energy efficient. However, reducing switching delay and lowering energy consumption need to be carefully balanced. New network architecture comprising two parallel networks have been proposed. A "super-highway" network using pipeline forwarding for IP packets would be used in conjunction with the current Internet which carries traditional traffic and signaling between routers that set up synchronous pipes in super-highway networks. The super-highway would carry traffic that has predictable patterns and require high bandwidth.

In WDM networks, high energy consumption originates from the optical network equipment which is used for traffic grooming. Hence, energy-efficient traffic grooming, which reduces the number of required lightpaths, considerably increases energy savings. Other approaches to reduce energy consumption include using Routing and Wavelength Assignment (RWA) heuristics that minimize the number of lightpath interfaces, and using digital signal processing for wavelength translation of the optical frequencies of each specific wavelength on the optical fiber when required. However, this process may be cost prohibitive due to the expense of the optical equipment based on existing technology needed to create the wavelength translation. Other possible solutions include reducing energy consumption of each network operation by performing dynamic traffic grooming over time.

Current telecommunications networks are based on an architectural model involving three classes of network domains: core, metro, and access. In core networks, efforts to reduce energy consumption can be divided into two categories: energy-efficient network design and energy-efficient network operations. The energy consumption of IP routers, EDFAs, and transponders is jointly minimized for an IP-over-WDM network by utilizing Mixed Line Rates (MLR). Likewise, shutting down idle network elements saves energy. To identify the maximum number of idle nodes and links while still supporting the ongoing traffic, heuristics and Mixed Integer Linear Program (MILP) models can be used to reduce the powered nodes (or equipment) during off-peak hours and during traffic fluctuations throughout the day. Similarly, idle line cards can be shut down when traffic load is low, while keeping the physical topology invariant or with the minimum required level of connectivity, to reduce power needs. "Green Routing" has been proposed which uses energy consumption of network equipment as the optimization objective. Also, greater attention is being paid to renewable energy. One idea to reduce carbon footprint is to establish core servers, switches, and data centers at locations where renewable energy can be found, and then to route traffic to the "green areas".

Wireless-Optical Broadband Access Network (WOBAN) is a novel access architecture, and can provide high-bandwidth services. Energy savings in the optical part of WOBAN by sleeping mechanism has been studied, and energy-efficient design of a unidirectional WDM ring network has been investigated.

Energy-efficiency is a major problem for data centers, which are vital to support current data applications. Optical networks play an important role in both data center inter- and intra-connections. An approach to reducing the energy consumption of high-speed intra-connection (inside data centers) links has been. Load distribution across data centers in different locations is also related with power-conservation. How to optimally distribute requests has also been studied.

Solutions based on analog Frequency Division Multiplexing (FDM) were widely used in the pre-SONET/SDH era, to multiplex transport channels together using spectral diversity in coaxial and fiber cables. Although analog RF/microwave Subcarrier Multiplexing (SCM) in fiber optics is still in use to carry radio signals between antennas and base station, FDM technologies in digital transport networks were abandoned due in part to their relatively low spectral efficiency when compared to Time Division Multiplexing (TDM) and synchronous transmission techniques, such as SONET and SDH. Another problem of traditional FDM (or SCM), being analog systems, is their susceptibility to accumulated waveform distortion and crosstalk. For these reasons analog FDM is not a competitive solution for large-scale optical networks. As an extension of SCM, Orthogonal Frequency Division Multiplexing (OFDM) introduces orthogonality between adjacent subcarrier channels, so that no guard band is required between adjacent channels, which maximizes optical bandwidth efficiency.

SUMMARY OF THE INVENTION

The present invention provides reduced power dissipation at the OTN layer by utilizing Digital Subcarrier Multiplexing (DSCM) technology executed on a DSCM add/drop multiplexer and cross-connect architectures. DSCM has advantages for wireless communications due to its high spectral efficiency and robustness against signal corruption. With advances in digital CMOS electronics and the increased use of optical networks, the present invention can be used to implement Digital Subcarrier Cross-Connects (DSXCs) which perform the same transport functions of the OTN layer while significantly reducing energy consumption in the network. Energy consumption is also reduced by efficiently designing the network routing and resource (the subcarriers) assignment algorithms cross-connect functionalities, including routing frequency assignment (RFA) algorithms.

The DSCM cross-connect architecture of the present invention may also be used to lower the power consumption of existing communication networks by introducing it in various network segments. For example, packet transport networks make use of Multiprotocol Label Switching-Transport Protocol (MPLS-TP) routers to create virtual circuits and these networks consume power at the approximate level of OTN. The reduction in power consumption offered by the DSXC layer may assist in the expansion of communication, Internet, and education services to economically depressed area. Likewise, these low power-consuming DSXC nodes can be powered by renewable energy such as solar cells or wind generators.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

FIG. 3 (PRIOR ART) is a block diagram illustrating the typical power usage of a prior art electronic router;

FIG. 4 is a block diagram illustrating the typical power usage of an optical circuit switch of the present invention;

DETAILED DESCRIPTION

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. "Forwardly" and "rearwardly" are generally in reference to the direction of travel, if appropriate. This terminology will include the words specifically mentioned, derivatives thereof, and words of similar meaning.

Figure 1:
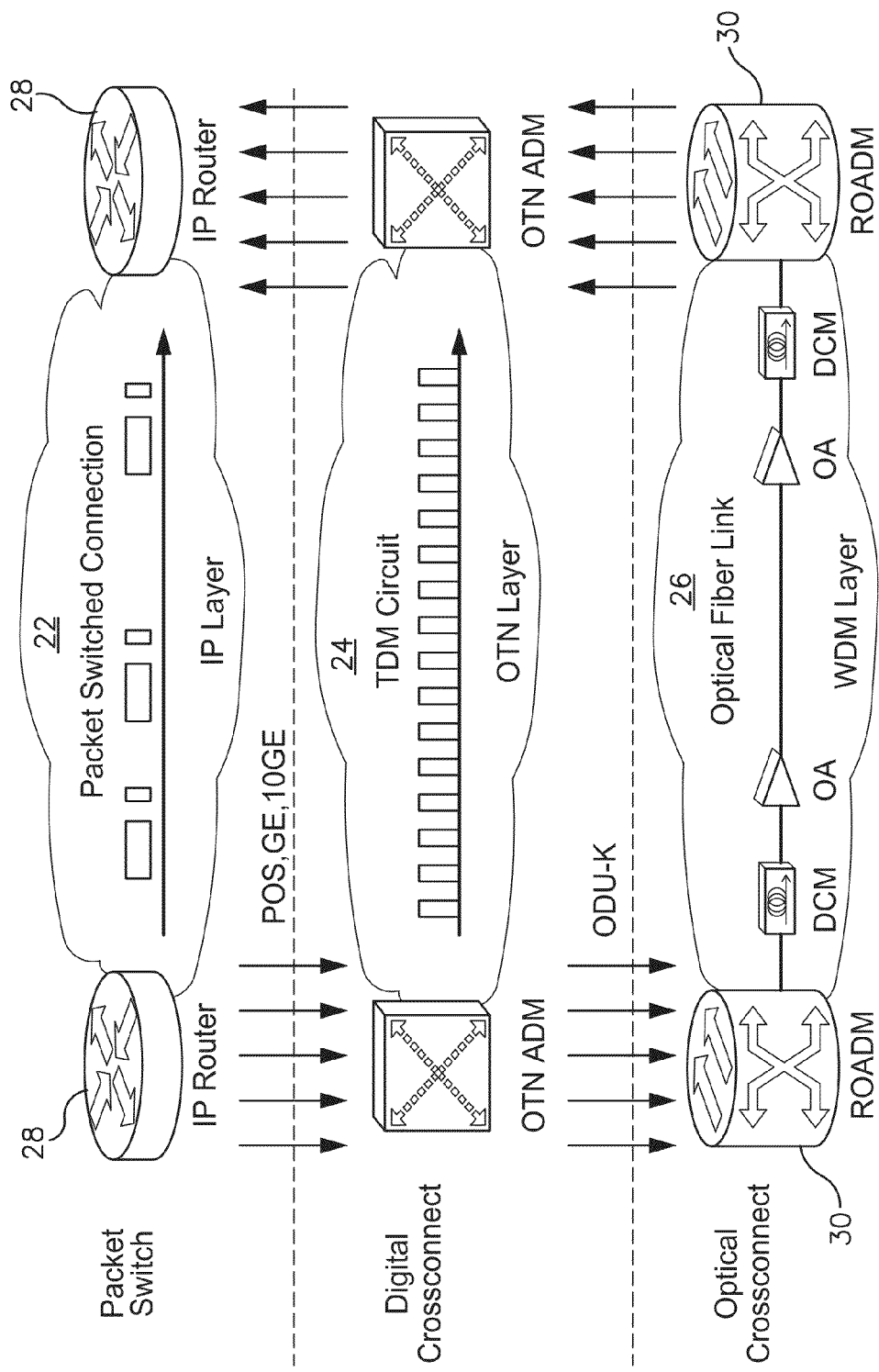
FIG. 1 (PRIOR ART) is a diagram of three layers of a prior art network using an IP layer, an OTN Layer, and a WDM layer.

Current telecommunications networks rely on multiple technologies to send and route optical or electrical communication signals to a desired location. Referring to FIG. 1, a prior art multilayer network 20 has an IP layer 22 which utilizes routers to deliver packets of information end-to-end across the network, an OTN layer 24 which utilizes DXCs to switch fixed time division multiplexed channels to create end-to-end circuits across the OTN network 24, and a WDM layer 26 which utilizes optical cross-connects (e.g., ROADMs) to switch wavelength signals to create end to end optical circuits. IP routers 28 offer packet switching control, achieving efficient statistical multiplexing of the available network resources across the user population. Optical layer cross-connects (OXC) 30 offer wavelength (or lambda) switching, i.e., lightpaths or circuits of light can be switched end-to-end across the optical network layer 26. The capacity of the optical circuit is fixed and set to the transmission rate available at the physical (fiber optics) layer, e.g., 10 Gbps, 40 Gbps, or 100 Gbps. Traffic grooming, consisting of multiple distinct circuits being combined together to form a single entity to be routed across the network, is provided by the OTN layer 24 placed between the IP layer 22 and the optical layer 26 to offer fine bandwidth granularity to the links connecting routers 28.

Figure 2:
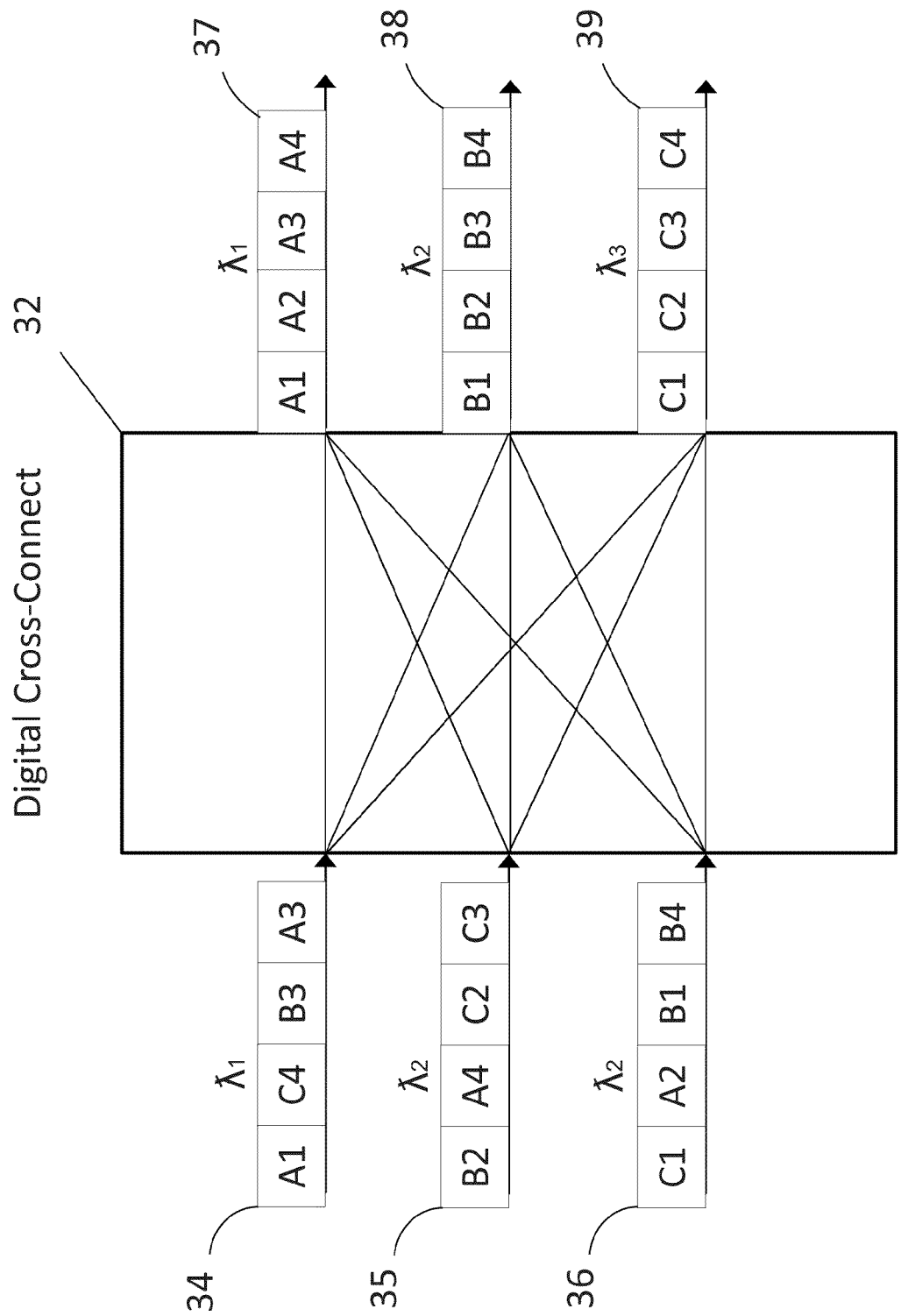
FIG. 2 (PRIOR ART) is a block diagram representing a prior art digital cross-connect switch using TDM.

Referring to FIG. 2, current OTNs (such as SONET/SDH) using DXCs utilize TDM circuit switching. TDM circuit switching is used to create end-to-end circuits with sub-wavelength bandwidth granularities and can be provisioned to interconnect routers or other add-drop multiplexing devices. The capacity of the OTN circuits is fixed and set to standard rates, e.g., 0.625 Gbps, 2.5 Gbps, or 10 Gbps. As shown in FIG. 2, DXC switch 32 receives data frames along three input ports 34,35,36. Each port receives the data frames transmitted on either an input fiber or on a wavelength of an input fiber, lambda1, lambda2, lambda3. The DXC switch 32 monitors each arriving data frame and, based on the routing information provided, each data frame is switched across the DXC to the correct output port 37,38,39. FIG. 2 illustrates the functionalities of the DXC switch 32 and the need for time padding or buffering to receive, read, and re-order the data frames before sending them to the correct output port.

From a power consumption standpoint, electronic processing of transported data, required in both OTN DXC and IP MPLS-TP routers, consumes significantly higher electrical energy compared to optical circuit switching performed by OXC which does not require electronic processing of optically switched data.

FIG. 3 is a graphical representation of energy consumption (Watts per Gb of switched data) for a typical electronic router. The packet forwarding engine and buffer together constitute 37% of the total energy consumption. The packet switch and control plane consume 10% and 11% respectively. An estimated 35% of the overall energy consumption is due to cooling, such as blowers and fans, and circuit inefficiency.

Another available transport option is MPLS Transport Profile (MPLS-TP). MPLS-TP is a profile of MPLS, which is designed for use as a network layer technology in transport networks. It is a connection-oriented packet-switched (CO-PS) solution and offers a dedicated MPLS implementation by adding mechanisms that provide support of critical transport functionality. MPLS-TP is to be based on the same architectural principles of layered networking that are used in long-standing transport network technologies like SDH, SONET, and OTN. The consumption for an MPLS router is similar to the one required in the OTN DXC using existing technology. In general, the IP routers are the most flexible and most expensive solution that is used in the access and at the edge of the core network where packets are classified at the ingress IP router and sent over pre-provisioned circuits to reach the egress IP router. The OXCs offer a cost effective solution to provision such circuits with the additional advantage offering built-in fast protection schemes against network element failures (5-9s reliability). However, they can only offer end-to-end optical circuits with the large granularity of an entire wavelength channel (e.g., 10 Gbps, 40 Gbps, or 100 Gbps). Both OTN DXCs and MPLS-TP routers are existing technologies offering end-to-end circuits across the core network with fixed (the former) or variable (the latter) capacity, that achieve sub-wavelength bandwidth granularity, along with fast protection schemes (5-9s) and a cost per switched byte of data that is favorable compared to IP routers. From a power consumption standpoint, electronic processing of transported data—which is required in both OTN DXC and IP MPLS-TP router—consumes significantly higher electrical energy compared to optical circuit switching performed by OXC (by an estimated factor of ten).

Considering that telecommunications networks are estimated to use approximately 1% of the world's energy produced each year, solutions have been proposed that reduce power consumption in a number of network architectures. The most effective of these solutions targets IP/MPLS routers, recommending a reduction of the packet rate processed in the router or even the complete switching off of some IO cards at times when the offered load is relatively low in the network. For comparison, in the optical domain, energy consumption is already relatively low compared to the electronic layer, and can be further reduced by switching off an entire wavelength channel, or even the full set of wavelength channels of a single fiber, which allows the in-line fiber amplifiers to be switched off during low traffic periods. However, these recent solutions do not address the power consumption that takes place in the OTN. In fact they do not even reduce the power consumption that is required to maintain the wavelength transmission link between fully functional nodes, besides offering the transmission card switch on/off option already mentioned.

Figure 5:
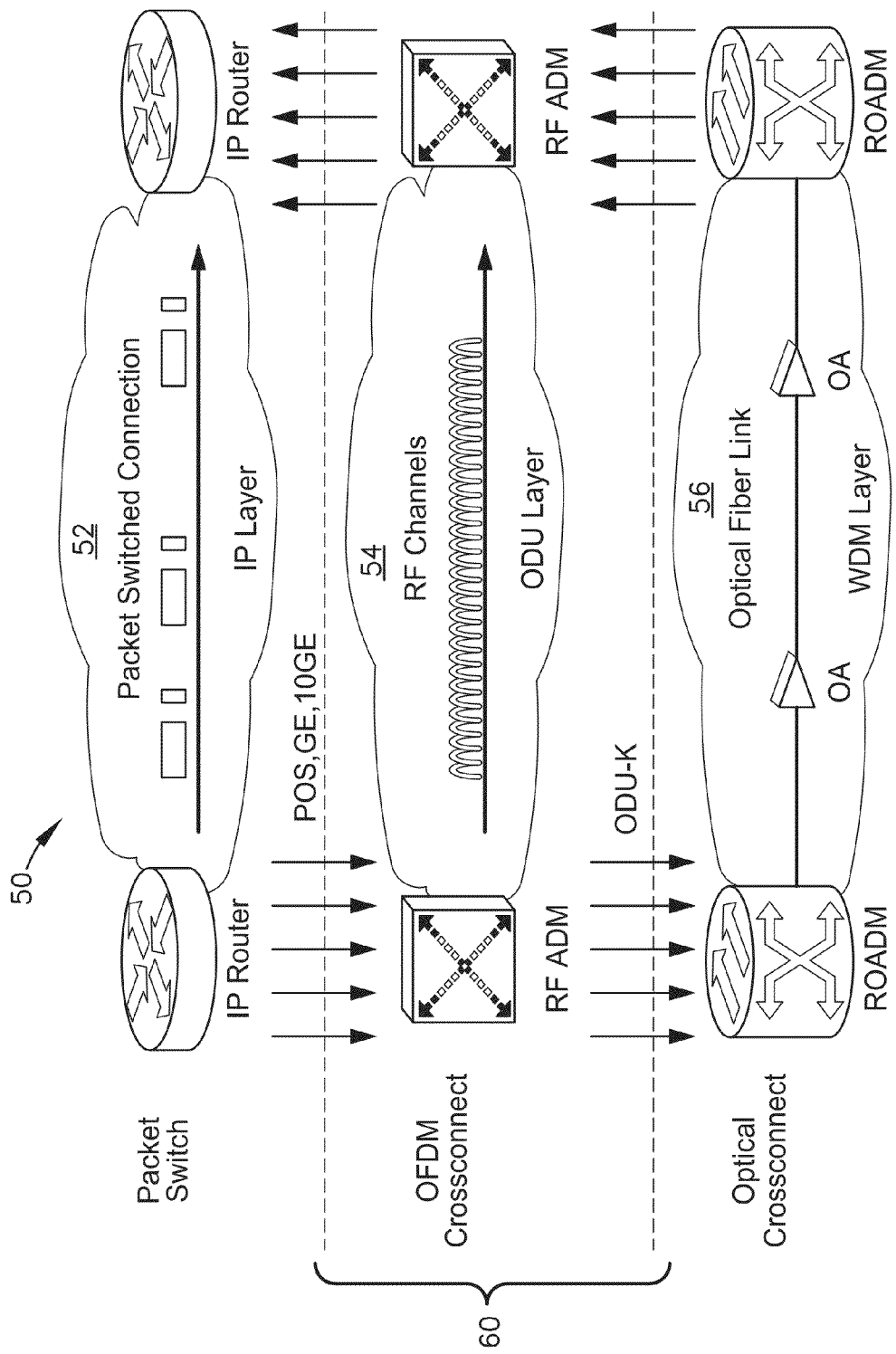
FIG. 5 is an illustration of a three layer architecture the present invention comprising the IP layer, a DSXC layer, and the WDM layer.
Figure 6:
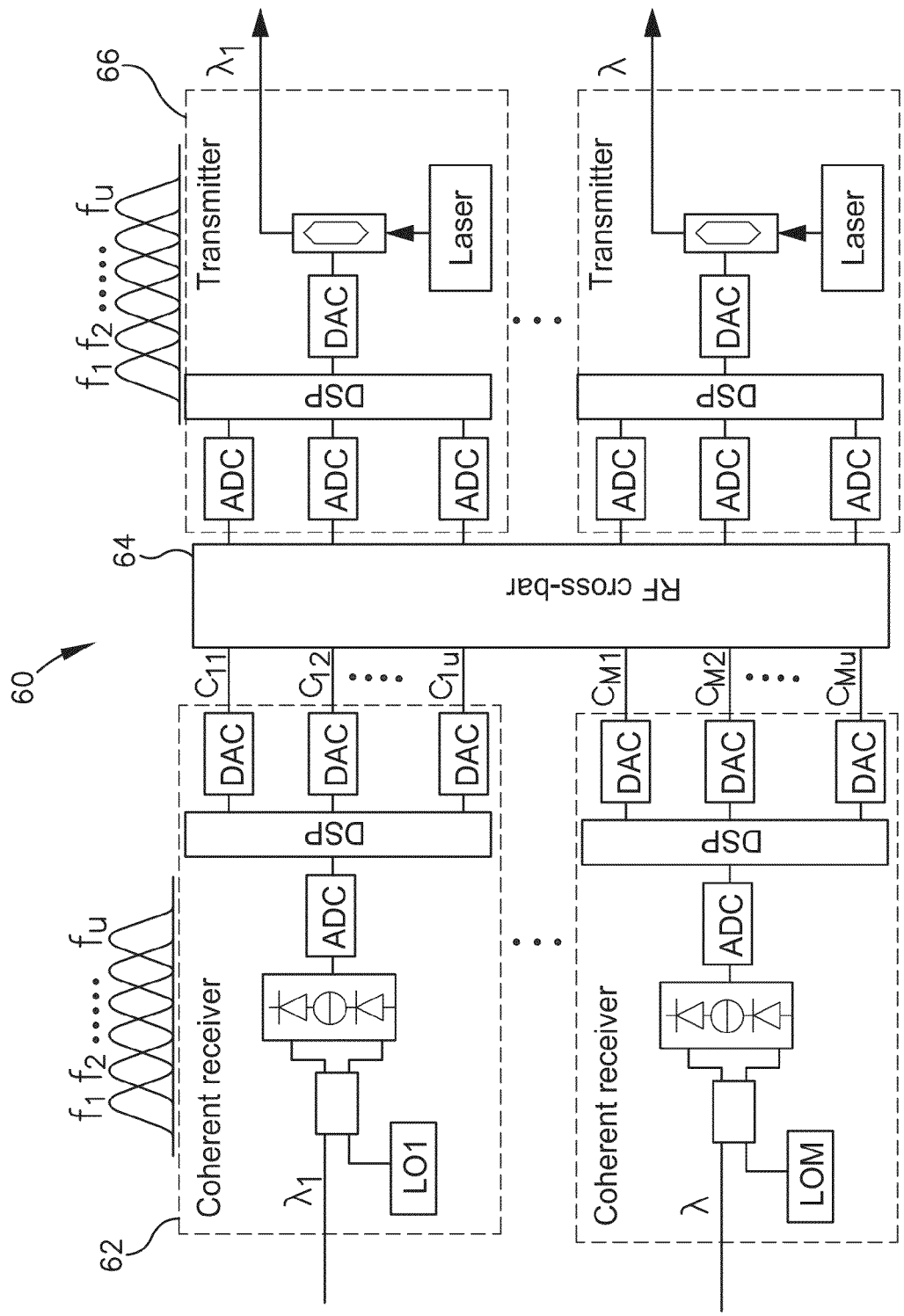
FIG. 6 is an illustration of a digital subcarrier cross-connect architecture and coherent transceivers of the present invention.

The present invention provides replacement technology for the OTN layer which is responsible for a significant fraction of the energy dissipated by today's transport networks. The invention is generally referred to as Digital Subcarrier Optical Network (DSON). Referring to FIGS. 5 and 6, a multilayer network 50 of the present invention has an IP layer 52, a DSON layer 54, and a WDM layer 56, wherein, in the OTN layer 54, the present invention replaces TDM based OTN/SONET/SDH with FDM-based DSCM and provides an innovative DSXC architecture 60 that can significantly decrease the power consumption at the OTN layer 54 while maintaining good spectral efficiency, channel granularity, data rate flexibility, and circuit switching speed. In DSON, switching and routing of sub-wavelength channels are performed in the frequency domain (rather than in the time domain of prior art OTN) using orthogonal subcarrier channels. More specifically, the present invention has the potential to (1) significantly reduce power consumption at the cross-connect by using a circuit switch architecture which eliminates both the forwarding engine and the electronic buffering of the transferred data in current transport solutions, and reduces power consumption at the cross-bar switch, as shown in FIG. 4, and (2) offer an adjustable transmission (line) rate at the sub-wavelength level (rather than the whole wavelength transmission rate) using fast electronic-domain frequency switching (as opposed to all-optical switching in WDM) to more efficiently support the offered amount of traffic with closely matching transmission rates in the provisioned circuits. It will be appreciated that the components of the DSON can be used for various other applications. Moreover, the DSXC architecture can be fabricated in various sizes and from a wide range of suitable materials, using various manufacturing and fabrication techniques.

Primary points of high electrical power consumption in routers are the forwarding engine, digital buffer, and packet switch fabric, while for DXCs they are the electronics in the line cards. DSON makes use of DSCM, a technology that multiplexes a large number of relatively low data rate subcarrier channels into a high capacity wavelength channel. Each subcarrier channel carries data intended for its own destination. In a manner similar to an OXC, the DSXC crossbar switch sets up static traffic paths from input to output ports, and a low consumption crossbar switch performs cross-connection operation at baseband. Both the forwarding engine and the digital buffer requirements of routers and DXCs are eliminated in the DSXC architecture 60. Digital signal processing (DSP) is used to perform DSCM at high data rates. FIG. 4 shows the projected power consumption distribution across the DSXC modules, which can be directly compared to the consumption of the electronic router modules shown in FIG. 3. The reported consumption of each module in DSXC is based on available data sheets, anticipated power consumption for the control plane based on existing control plane products, blowers, and power inefficiency levels that are similar to those of already existing networking equipment. As an example, for a particular implementation the overall power consumption of DSXC is projected to be around 1.8 W/Gb, which offers a reduction factor of 5 compared to the ~10 W/Gb of both core IP routers and SONET equipment.

In addition to reducing energy consumption, the DSON transport architecture 54 of the present invention offers the following additional advantages (which are discussed in detail below): (1) high spectral efficiency, when compared to traditional SCM solutions, due to the orthogonality and digital isolation between subcarrier channels crosstalk between them can be minimized without the need for a spectral guardband; (2) fast switching speed using an electronic cross-bar switch when compared to an all-optical cross-connect; (3) signal robustness against optical transmission impairment, which may entirely circumvent the use of chromatic dispersion and PMD compensators in the optical layer; (4) direct access to individual subcarrier channels for traffic monitoring and add/drop functionalities, with line rates that span from 1 Gbps to 100 Gbps; (5) common functionality of the DSON layer 54, e.g., fast protection switching and rerouting of subcarrier channels upon network element failure detection; (6) fast provisioning and switching of subcarrier circuits (~100 ns) in the DSXC 60 without being adversely affected by the signal transient instability that may originate in the optical layer; and (7) flexible data rate of each subcarrier to support a variety of concurrent bandwidth/capacity end user circuit requirements.

In conventional analog-based WDM and SCM systems, adjacent channels must be separated by a guardband to avoid inter-channel crosstalk, and therefore the optical bandwidth is not fully utilized. In a DSCM system implemented using OFDM, frequency spacing between subcarriers is equal to the symbol rate carried by each channel, and spectral overlap is allowed. Orthogonality between adjacent channels is used so that digital integration over a bit period is able to remove inter-channel crosstalk. Advanced DSP algorithms also allow for the compensation of various transmission impairments such as chromatic dispersion and PMD.

By virtue of the distinct OFDM subcarrier channels (each with sub-wavelength bandwidth granularity) carried by the optical signal, cross-connection operations of such channels are facilitated as follows. Referring to FIG. 6, the DSXC architecture 60 and operating principle is illustrated wherein each wavelength signal carries u orthogonal subcarrier channels. An OFDM receiver 62 detects the incoming optical signal at lambdai and decomposes it into u baseband RF outputs $ci1, ci2, \ldots ciu$. Data packets on each subcarrier are arranged such that they all have the same destination node, and therefore, each subcarrier channel does not have to be decomposed into individual packets/frames (which would require buffering and re-grouping operations as in a TDM cross-connect). If there are W wavelength channels coming into and departing from the DSXC, the RF crossbar circuit-switch 64 can perform the desired cross-connection. After the crossbar switch 64, each subcarrier is sent to a transmitter 66, assigned a new subcarrier frequency, and regrouped according to the destination, and modulated onto an outgoing wavelength signal.

The use of electronic processing to compensate for optical dispersion building up along the optical fiber has gradually replaced the use of optical domain dispersion and PMD compensation. CMOS electrical signal processing capabilities built into commercial optical transceivers can now be utilized to perform OFDM operation. In addition, coherent detection has become practical and adopted by the telecommunications industry. The power consumption estimation for such signal processing is based on an off-the-shelf coherent 46 Gbps QPSK transceiver equipped with DSP Agile engine. With proper modification, ADC, DAC, and DSP in this type of digital optical transceiver can be readily reconfigured to perform OFDM operation. The embodiment of the present invention shown in FIG. 6 incorporates DSXC using digital transceivers based on coherent detection. A distinct advantage of using digital transceivers is that the accumulation of noise, crosstalk, and distortion can be avoided, which can be important in multi-hop optical networks with multiple cross-connection nodes. Cross-connect switching performed in the electronic domain and at the subcarrier level ensures great speed, control flexibility, and bandwidth granularity.

In a traditional OFDM system, a single data stream is first mapped into a 2-D array row-by-row, and an IFFT is performed such that each column becomes a subcarrier channel. In this way an OFDM symbol is usually partitioned into different subcarriers, which are transmitted in parallel, each at a transmission rate which is a fraction of the data stream rate. In the corresponding OFDM receiver, an FFT process is used to convert the 2-D data array back into frequency domain and the original data stream is reconstructed through parallel to serial conversion. In this process, the entire set of subcarriers is handled as a whole, as each subcarrier is the bearer of one fraction of the data stream. Conversely, the OFDM transceiver in the cross-connect architecture of the present invention allows for the selection of individual subcarrier channels to carry distinct data streams. In this case, each input data stream is directly mapped onto a subcarrier, and no FFT is required in the receiver.

Figure 7:
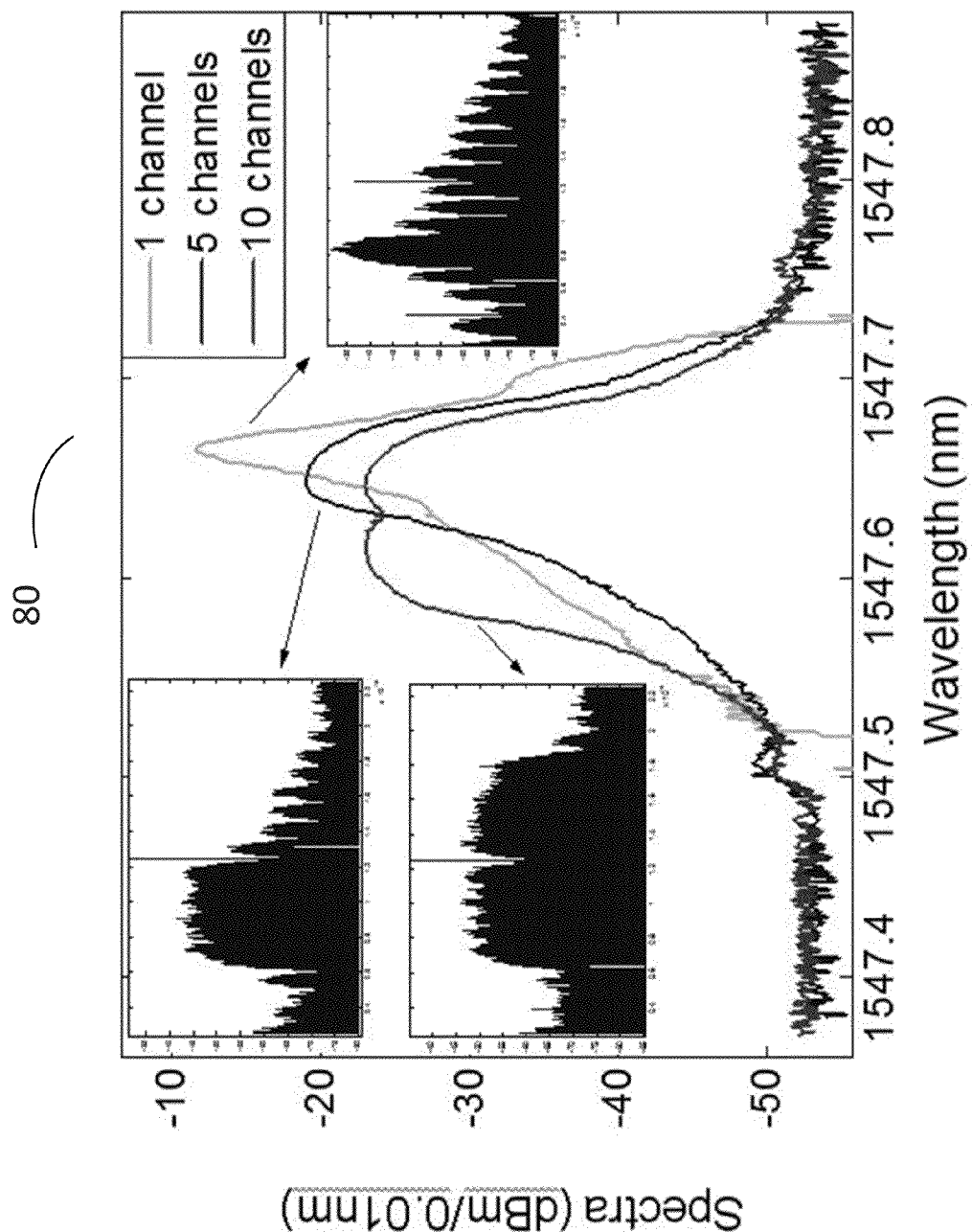
FIG. 7 is a graphical representation of the optical spectra of OFDM signals with C1, C5, and C10 subcarrier channels each carrying a 2 Gbps QPSK signal.
Figure 8:
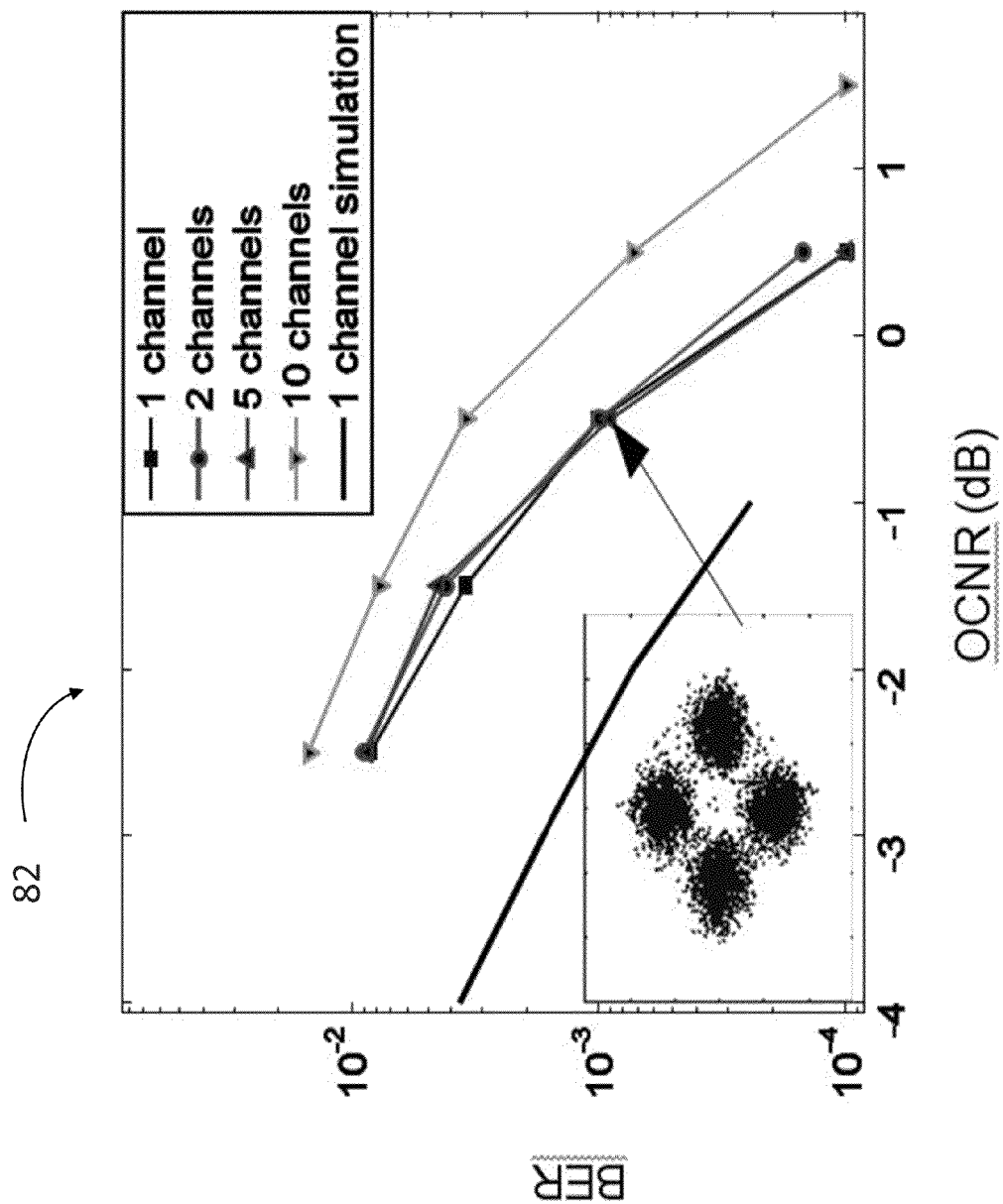
FIG. 8 is a graphical representation of a system Bit Error Rate (BER) versus optical-to-noise-ratio for the signals carried in subcarrier channels C1, C5, and C10.

In one example implementation of the present invention, a CIENA 10 Gbps eDCO transceiver, originally designed for electronic domain dispersion compensation, was reconfigured into an OFDM transmitter. This transmitter has an on-board 22 Gbps DAC with digital interface. An IQ modulator was added to enable both intensity and phase modulation. At the receiver, any subcarrier channel can be selected by tuning the wavelength of the local oscillator (LO). A 90° optical hybrid was used before the photodetector to separate the I and Q components. 75 km standard single-mode fiber was used between the transmitter and the receiver. FIG. 7 shows an example of the measured optical spectra 80 obtained using DSCM: signals of subcarriers C1, C5, and C10 each carrying 2 Gbps QPSK data. The total optical bandwidth on this wavelength is 10 GHz, and the total data rate is 20 Gbps. FIG. 8 shows the measured BER vs. optical carrier-to-noise ratio (OCNR) 82 with different numbers of subcarrier channels. There is negligible increase of OCNR penalty when the number of subcarrier channels increases from 1 to 5 where all 5 subcarrier channels are located on the lower sideband with respect to the center optical carrier. When the other 5 subcarrier channels on the upper sideband of the spectrum are added to make the total number of channels 10, an approximately 1 dB OCNR penalty is introduced. This can be partly attributed to the imperfect sideband suppression in the single-sideband modulation process. While there is negligible OCNR degradation introduced by the 75 km transmission fiber, the 1.5 dB OCNR degradation of the measured BER when compared to the numerical simulation of the same system can be attributed to pass-band ripples in the RF amplifiers, multi-pass reflections in the optical system, and time jitter in the receiver.

Figure 9:
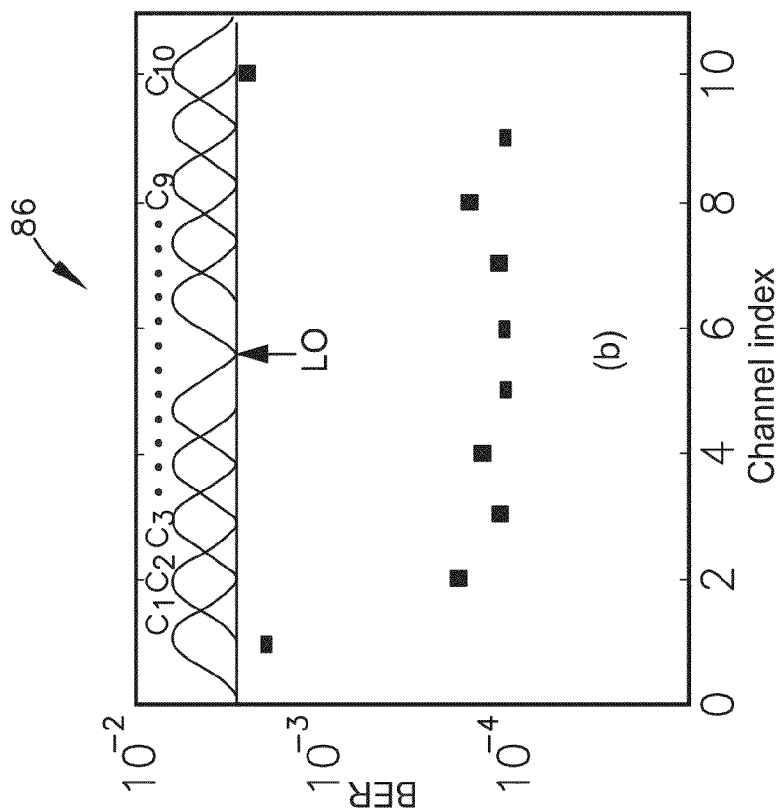
FIG. 9 is a graph of BER values for simultaneous detection of channels C6 through C10 when a local oscillator (LO) is set at the central frequency of channel C9.
Figure 10:
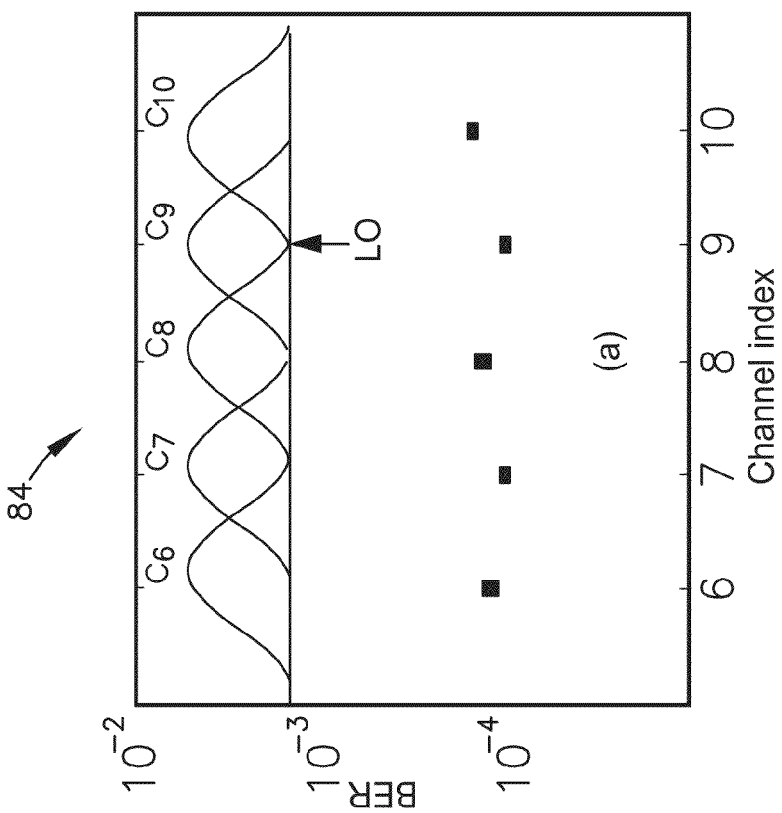
FIG. 10 is a graph of results when the local oscillator wavelength is set to the center of the signal optical carrier in an attempt to detect all ten subcarrier channels.
Figure 11:
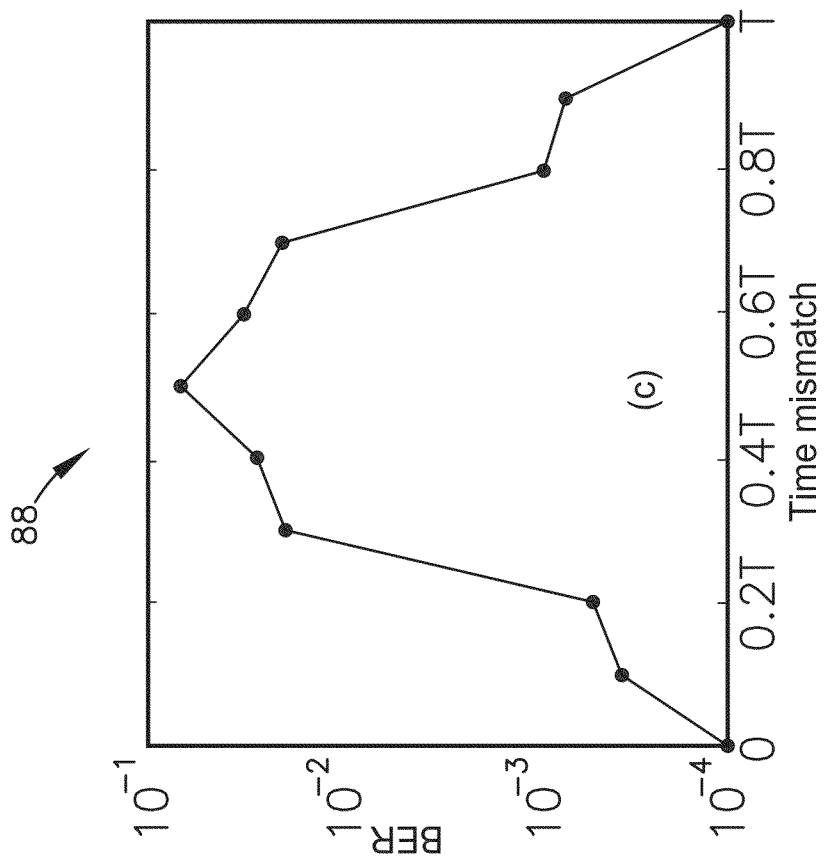
FIG. 11 is a graph of the impact of bit time synchronization between adjacent subcarrier channels.

This DSCM system is highly flexible because the receiver can select any one or multiple subcarriers without changing the transceiver hardware. Channel selection is achieved by tuning the optical LO to the desired subcarrier frequency in the received optical spectrum, and coherent IQ detection translates the optical spectrum to the electrical domain. All subcarrier channels within the receiver electrical bandwidth can be detected individually and crosstalk between them can be removed through digital processing. FIG. 9 shows the simultaneous detection 84 of channels C6 through C10 when the LO was set at the central frequency of channel C9. The BER is measured using an OCNR of 1.5 dB. No significant performance variation was found among these channels. FIG. 10 shows results 86 when the LO wavelength was set to the center of the signal optical carrier in an attempt to detect all ten subcarrier channels. The results show reasonably uniform BER performance except for the two outmost channels C1 and C10. The increased BER in these two channels is due to the bandwidth limit of the particular receiver which is only 6 GHz, thus the spectra of channel C1 and C10 are already partially outside the receiver bandwidth. The impact 88 of bit time synchronization between adjacent subcarrier channels is shown in FIG. 11. Bit time misalignment may be kept below ±20% of the bit length T to avoid significant BER degradation.

DSCM is a generalized form of OFDM in which digital electronics is used in the transmitter to generate coherent subcarriers and each subcarrier carries an independent data stream. In comparison to optically generated subcarriers, it is easier to ensure precise frequency spacing between subcarriers when they are generated digitally.

In the DSXC illustrated in FIG. 6, data bits carried by different wavelengths may not be synchronized. If the RF switch fabric does not provide a retiming function after the switch and regrouping, bit-time misalignment between adjacent subcarrier channels may cause BER degradation as indicated in FIG. 11. In addition, the electrical bandwidth of the OFDM receiver 62 has to be wide enough to include the spectral sidebands of each subcarrier channel, otherwise crosstalk cancelation would be incomplete. Narrowband Nyquist filters may be suitable to spectrally separate subcarrier channels and eliminate the crosstalk. This type of digital filter may not be feasible in the optical domain, but it can be realized in digital electronics. This also eliminates the need for bit-time synchronization.

In the DSXC architecture 60, different numbers of subcarrier channels can be bundled together and switched to the same destination. This capability of mixed data rate provides additional flexibility in an optical network. Furthermore, because subcarrier channels are generated digitally, high order modulation formats such as M-PSK and M-ary with M>4 can be used to further improve spectral efficiency if desired.

In addition to DSCM transceivers, another building block in the DSXC architecture 60 is the electronic crossbar circuit switch 64. A number of different types of switches exist, including analog RF switches, and regenerative digital switches. The choice depends on the desired number of subcarrier channels, data rate, switching speed, and maturity of the device technologies.

One way to realize a crossbar switch is to use analog RF circuits. For example, a Honeywell HRF-SW1031 1×6 RF switch device consumes approximately 0.1 mW power with 2 GHz bandwidth per port. Six units of 1×6 RF switches can be combined to make a 6×6 cross-connect, consuming 0.6 mW overall. A large scale Shuffle-net with k columns and $p^k$ rows can be constructed using 6×6 switch building-blocks (p=6). To support $M=p^k+1$ channels, the required total number of 6×6 switches is $N=k \cdot p^k$. If each subcarrier channel has 1 Gbps capacity, a 100 Tbps DSXC will need 105 ports. This requires approximately 9×104 units of 6×6 RF switches, consuming 54 W quiescent power, which is only 0.54 mW/Gb. Dynamic power consumption, on the other hand, depends on how frequently the switch has to be reconfigured. For RF-based analog switches, the dynamic power is usually negligible. Although analog RF crossbar switches use minimum electrical power, and the power consumption is independent of the data rate of each port, realization of RF crossbar switches with a large port count may be limited by crosstalk and power splitting loss.

With the recent advances in CMOS electronics, large scale crossbar switches based on CMOS circuits have become commercially available. This type of switch provides retiming and reshaping of the signal waveforms, thus compensating for inter-channel crosstalk and power splitting loss. For example, the Vitesse VSC-3140 chip is a non-blocking any-to-any switch with 144 input and 144 output ports. The bandwidth of each port can be as high as 4.2 Gbps with an electrical power consumption of approximately 16 W. Using the switch at full bandwidth, the total chip switching capacity is approximately 600 Gbps and the power efficiency is 26.5 mW/Gb. To scale up switching capability, multiple VSC-3140 chips can be combined to form a multi-stage switch fabric. For example, a 2880×2880 non-blocking switch network can be constructed using 80 VSC-3140 chips arranged in 3 layers (20; 40; 20). In this case, the total switching capacity can reach 10 Tbps with a power efficiency of 100 mW/Gb, which is still two orders of magnitude less than the consumption of the TDM-based DXC.

In the CMOS-based regenerative crossbar switch, the major power consumption is caused by changing the state of the flip-flop representing each data bit, and is, therefore, linearly proportional to the actual traffic volume. Unlike typical TDM-based DXC, this solution does not require memory/buffers and digital shift registers for data handling and re-grouping.

FIG. 4 shows the estimated power consumption of the crossbar switch fabric to be 58 mW/Gb. This result was obtained from the datasheet of the 144×144 Vitesse VSC3144 chip, which consumes 21 W for a total bandwidth of 144·10 Gbps. A larger 2880×2880 switch can be built using three stages of 20:40:20 VSC3144 chips, which provides a total capacity of 28.8 Tbps with 1680 W total consumption (hence the 58 mW/Gb).

DSXC architectures can be designed to address even larger cross-connect solutions as illustrated in the following example. Let F be the number of fibers reaching the network node, W the wavelengths per fiber, and O the number of orthogonal frequencies (subcarrier channels) per wavelength. For reasonable values of these three parameters, e.g., F=9, W=40, and O=100, the total number of subcarrier channels available at the node greatly exceeds the 3 stage, 2,880 available crossbar size. A number of crossbar modules are then combined together to cross-connect the whole set of frequencies.

Figure 12:
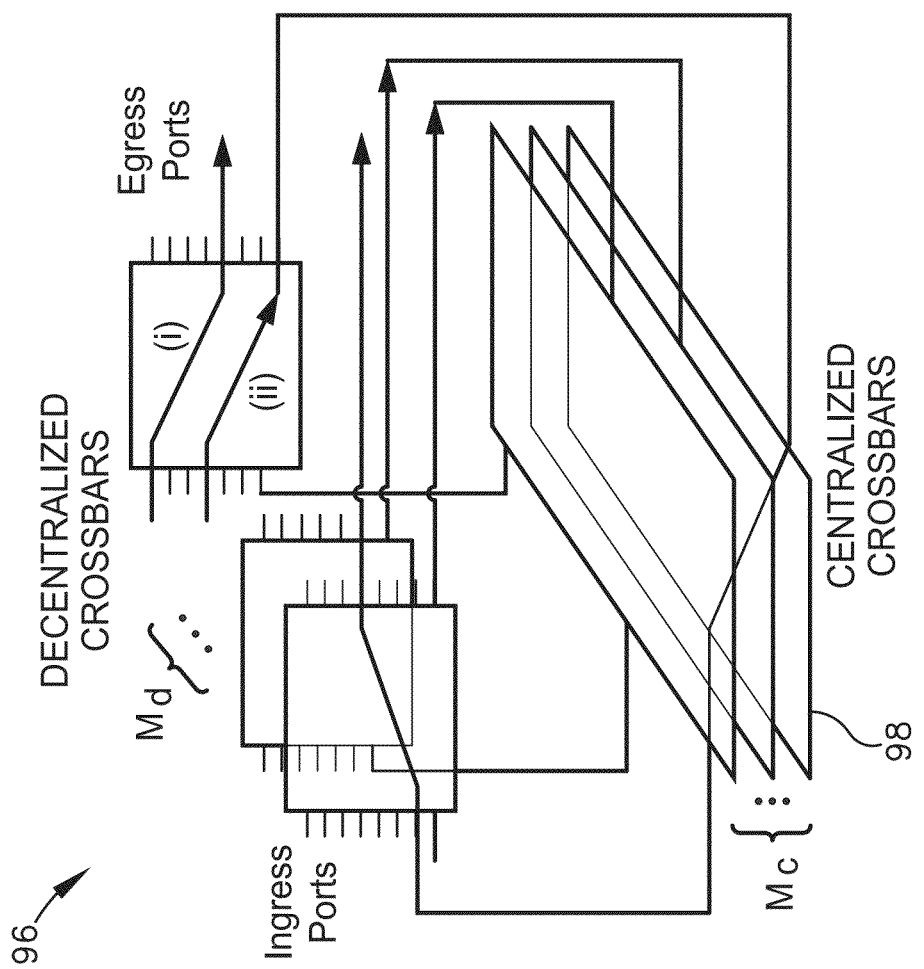
FIG. 12 is an illustration of a two-stage crossbar switch of the DSXC of the present invention.

Assume that M crossbar modules are interconnected to form the DSXC as shown in FIG. 12, with Md decentralized modules 96, each connected to Cd incoming and Cd outgoing subcarrier channels, and M−Md=Mc centralized modules 98 being used to interconnect the Md decentralized modules 96. Each centralized module 98 has Cc input ports and Cc output ports. On average, Cc/Md of these ports are assigned to interconnect the centralized module 98 with one decentralized module 96. Note that there are at least two options to cross-connect an incoming subcarrier channel as shown in FIG. 12: (i) both the input port and the output port of the channel belong to the same decentralized module 96, and (ii) the input port and the output port of the channel belong to distinct decentralized modules 96, in which case one centralized module 98 is required to cross-connect the channel from one decentralized module 96 to the other. Option (i) may be is preferred over (ii) as it reduces the total number of crossbar modules required (and the total amount of energy dissipated) in the DSXC. Assuming that the fraction of channels that requires option (ii) is x, the total number of required crossbar modules is approximately:

$$M_c = F \cdot W \cdot O \cdot x / C_c$$

$$M_d = F \cdot W \cdot O \cdot (1+x) / C_d$$

As discussed, at least two options are available when cross-connecting a channel: (i) only one decentralized module 96 is required, or (ii) three modules, one centralized 98 and two decentralized 96 are required. The computation of routing and frequency assignment (RFA) for end-to-end circuit requests is important in ensuring that the value of x (and amount of energy dissipated) is minimized. In some instances, solving the frequency assignment problem is an effort related to finding the solution to the improper coloring of a conflict graph.

The following is an example to illustrate how the centralized module is used for routing in DSON. All other combinatorial options of assigning fiber links, wavelengths, and subcarrier channels to the DSXC IO ports are also possible and should be considered as derivative cases of the following example. Assume that the network is modeled as a graph G(N,L), with N being the set of |N| nodes and L being the set of |L| links in the DSON. Without loss of generality, assume that every node is equipped with the same DSXC architecture 60 shown in FIG. 12. Let D(n,d) indicate the d-th decentralized crossbar module at node n=1, 2, . . . |N|. Assume that the decentralized modules 96 are connected via the network links in L to form Md subnets as follows: modules D(n,i) n=1, 2, . . . , |N| are interconnected and belong to Subnet i. If the circuit request is routed using only the crossbar modules of one subnet, its assigned subcarrier channel is cross-connected using option (i). If a circuit request is routed using two or more subnets, each time its subcarrier channel changes subnet, option (ii) is implemented at one DSXC node. Assume that the routing of each circuit request is given, i.e., a path consisting of an ordered subset of nodes in N. A conflict graph is then created in which each vertex represents one of the circuits, and a pair of vertices is connected by an edge if the two corresponding circuits share at least one common link in L. The conflict graph can be improperly colored using existing algorithms to assign each vertex a color such that at most k neighboring vertices are colored with the same color, while attempting to minimize the number of required colors overall (the chromatic number of the conflict graph). By choosing k to be the maximum number of subcarrier channels that can be supported by one decentralized crossbar module, all vertices (circuits) colored with color i will be assigned to Subnet i, and the chromatic number will indicate how many subnets (Md) are required to avoid the use of centralized crossbars. A variant of the problem is when Md cannot be as large as the chromatic number of the graph. In which case, the vertices (circuits) colored with any color up to Md will be routed using option (i), and the other circuits will be routed using option (ii), i.e., will make use of two or more subnets and use some centralized crossbar modules. As a special case (k=1), the problem of minimizing Mc is equivalent to the problem of minimizing the number of wavelength converters when solving the routing and wavelength assignment (RWA) problem for a set of lightpath requests in a WDM network.

In an optical network, different subcarriers may travel over different distances, and pass through different numbers of network nodes (cross-connect switches) as chosen by the network routing algorithms. This may result in relative delay and difference in data quality. In order to equalize their transmission performance, it may be desirable to apply unequal power provisioning as well as different levels of modulation (such as M-ary) for different subcarriers at cross-connect switch nodes.

From a network standpoint, a cross-connect has to provide fine enough granularity to satisfy users with varying bandwidth demands. With the trend of rapidly increasing capacity demand, SONET cross-connect switches are moving to higher base rates, from OC-3 to OC-12 and even to OC-48, which simplifies the transceiver MUX and DEMUX complexity. Similarly, for the DSXC 60 of the present invention, a higher subcarrier data rate reduces the number of subcarriers for a particular overall capacity. This will help decrease both the required port-count of the switch fabric and DSXC power dissipation. Although a single data rate for all subcarrier channels would imply simple system architecture, mixed data rates will allow for tradeoffs between traffic demand, power dissipation, and system complexity, and thus provide more options when optimizing overall network performance.

A hybrid data rate is possible with DSXC if the data rates are integer multiples of the lowest rate. In this case, bandwidth efficiency may be reduced and the integration at the receiver 62 may have to be performed over the longest bit period. On the other hand, if Nyquist filters are used to spectrally separate subcarrier channels, this integration may not be required, but the digital bandpass filters with sharp edges may require longer delay taps and thereby make CMOS realization more difficult. These and other equivalent techniques can be leveraged to obtain the right compromise in DSON.

Routing and orthogonal frequency assignment (RFA) algorithms will choose which subset of network resources (subcarrier channels) are reserved for the incoming end-to-end circuit requests. The optimal RFA solution is a hard problem (the routing and wavelength assignment (RWA) problem can be seen as a special case of RFA, and it is known to be NP-hard).

In a partial summary of certain features, the present invention uses DSCM or equivalent digital signal processing to enable spectrally efficient multiplexing capability of orthogonal channels (circuits) in optical communications and networking. Solutions include fiber based networks as well as free space optics (e.g., infrared communications). Individual channels or a group of channels can be independently routed across a network of nodes via DSXC nodes. Special Gateway or Add Drop Multiplexing nodes are included to provide the necessary interface for other network technologies to establish and use the channels in the network. The transmission rate can be individually assigned to each channel, thus offering a comb of potential transmission rates end-to-end across the network. Rates may be as low as sub-Gbps and as high as hundreds of Gbps. For comparison, current technologies like OTN, SONET and SDH can only offer ODU-0 (1 Gbps), ODU-1 (2.5 Gbps), ODU-2 (10 Gbps), ODU-3 (40 Gbps), ODU-4 (160 Gbps) and ODU-Flex, with the latter offering products that are ODU-2 or greater. The frequency used for a channel (or the frequencies used for a group of channels) can be changed along the end-to-end path by using the specially designed cross-connect architecture, thus giving more flexibility to routing. The present invention can be used in conjunction with WDM, and the wavelength used to carry the frequency of the channel (or frequencies of a group of channels) can be changed along the end-to-end path by using the cross-connect architecture, thus giving more flexibility to routing. The last two features can be jointly applied to the same channel (or group of channels). With the present invention, network wide time synchronization may not be required as multiplexing is performed in the frequency domain. For comparison, existing solutions are based on time multiplexing, and network wide synchronization is needed, e.g., OTN, SONET, SDH. Channels may be provisioned statically, or channels may be set up and torn down dynamically at all possible time scales, down to milliseconds or less. In the DSXC of the present invention, transmitted data need not be buffered for synchronization and cross-connection purposes, unlike in other solutions, e.g., OTN, SONET, SDH.

Furthermore, the present invention offers end-to-end circuits that can be built across access networks, Passive Optical Networks (PONs), Local Area Networks (LANs), enterprise networks, Metro Area Networks (MANs), and across Wide Area Networks (WANs), including WDM networks based on ROADMs. The preceding network types can be combined in all possible permutations. End-to-end channels or circuits can be used to interconnect IP routers, OTN, SONET, SDH nodes, end user equipment, data center (Cloud) network interfaces, enterprise, and residential user equipment. The present invention can be adapted to support unicast, anycast, and multicast traffic, individually or combined. Another aspect of the present invention is that it can be used in conjunction with all types of network management, network control, and network monitoring software, as well as all types of signaling and interfaces in order to set up, tear down, restore, reroute, etc. channels or circuits across the network. All known protection and restoration mechanisms may be applied to the subcarrier circuits, including dedicated protection, shared protection, fast reroute, etc. Power consumption per unit of traffic carried is expected to be lower compared to other electronically based transport network technologies (OTN, SONET, SDH, MPLS-TP). In addition, when not in use, part of the electronics in the DSXC can be switched off, to reduce power consumption to run the network and transport the offered traffic. The DSXC architecture can be single stage or multi-stage to offer scalable solutions. Hierarchical multiplexing may be applied to the present invention to offer multiple levels of traffic multiplexing. The advantage of hierarchical multiplexing is to offer modular options to span across a large spectrum of transmission rates, ranging from sub-Gbps to hundreds of Gbps.

The invention claimed is:

1. A method of transporting data along an optical network, the method comprising the steps of:
    (a) detecting an incoming optical signal on a particular wavelength and decomposing the optical signal into one or more radio-frequency signals, wherein each of the one or more radio-frequency signals has a destination;
    (b) directing the one or more radio-frequency signals via a radio-frequency crossbar circuit switch to an output circuit based on their destinations;
    (c) assigning the one or more radio-frequency signals to a new frequency;
    (d) grouping the one or more radio-frequency signals according to their destinations; and
    (e) modulating the one or more radio-frequency signals onto an outgoing optical signal.

2. The method as set forth in claim 1, wherein coherent detection is used to detect the incoming optical signal.

3. The method as set forth in claim 1, further including the step of assigning the one or more radio-frequency signals to one or more subcarrier channels.

4. The method as set forth in claim 3, wherein the subcarrier channels are static.

5. The method as set forth in claim 3, wherein the subcarrier channels are dynamically created and eliminated as needed.

6. The method as set forth in claim 3, further including the step of using one or more narrowband Nyquist filters to spectrally separate the subcarrier channels.

7. The method as set forth in claim 3, wherein one or more of the subcarrier channels is selected by tuning an optical local oscillator to a desired subcarrier frequency in a received optical spectrum, and IQ detection is used to translate the received optical spectrum to an electrical domain.

8. The method as set forth in claim 3, further including the step of assigning a transmission rate to each subcarrier channel, wherein each transmission rate is approximately between less than one giga-bit-per-second and hundreds of giga-bits-per-second.

9. The method as set forth in claim 3, further including the step of combining a plurality of the subcarrier channels in the outgoing optical signal.

10. The method as set forth in claim 3, further including the step of bundling together two or more of the subcarrier channels having a common destination, and the radio-frequency crossbar circuit switch switching the bundled two or more subcarrier channels to the same output circuit based on the common destination.

11. The method as set forth in claim 3, wherein the radio-frequency crossbar circuit switch includes a plurality of interconnected crossbar modules, with each crossbar module handling a subset of the subcarrier channels.

12. The method as set forth in claim 11, wherein two or more of the crossbar modules are decentralized crossbar modules connected to an incoming subcarrier channel and an outgoing subcarrier channel, and one or more of the crossbar modules are centralized crossbar modules connecting the two or more decentralized crossbar modules together.

13. The method as set forth in claim 3, further including the step of the radio frequency crossbar circuit switch applying unequal power and different levels of modulation to different subcarrier channels in order to equalize transmission performance.

14. The method as set forth in claim 1, wherein the radio-frequency crossbar circuit switch includes a plurality of analog radio-frequency switches.

15. The method as set forth in claim 1, wherein the radio-frequency crossbar circuit switch includes a plurality of regenerative digital switches.

16. The method as set forth in claim 1, further including the step of digitally generating one or more coherent subcarrier channels, and assigning the one or more radio-frequency signals to the one or more coherent subcarrier channels.

17. The method as set forth in claim 16, further including the step of assigning a transmission rate to each subcarrier channel, wherein each transmission rate is approximately between less than one giga-bit-per-second and hundreds of giga-bits-per-second.

18. The method as set forth in claim 16, further including the step of combining a plurality of the subcarrier channels in the outgoing optical signal.

19. A method of transporting data along an optical network, the method comprising the steps of:
(a) detecting an incoming optical signal on a particular wavelength and decomposing the optical signal into one or more radio-frequency signals, wherein each of the one or more radio-frequency signals has a destination;
(b) directing the one or more radio-frequency signals via a radio-frequency crossbar circuit switch to an output circuit based on their destinations;
(c) assigning the one or more radio-frequency signals to one or more subcarrier channels;
(d) using one or more filters operable to spectrally separate the subcarrier channels;
(e) assigning a transmission rate to each subcarrier channel;
(f) grouping the one or more radio-frequency signals according to their destinations; and
(g) modulating the one or more radio-frequency signals onto an outgoing optical signal.

20. An optical network using digital subcarrier cross-connect switching, the optical network comprising:
a receiver operable to detect an optical signal on a particular wavelength and to decompose the optical signal into one or more radio-frequency signals, wherein each of the one or more radio-frequency signals has a destination;
a radio-frequency crossbar circuit switch operable to receive the one or more radio-frequency signals and direct them to an output circuit based on their destinations; and
a transmitter operable to receive the one or more radio-frequency signals from the radio-frequency crossbar circuit switch and assign them a frequency, group one or more of the radio-frequency signals according to their destinations, and modulate one or more of the radio-frequency signals onto an outgoing optical signal.

* * * * *